United States Patent [19]

Paschakarnis et al.

[11] 4,119,520
[45] Oct. 10, 1978

[54] WATER SUPPLY SYSTEM

[75] Inventors: Peter Paschakarnis, Schwebheim; Bernd Hengst, Schweinfurt am Main; Rainer Wychnanek, Zell, all of Germany

[73] Assignee: Sachs-Systemtechnik GmbH, Schweinfurt am Main, Germany

[21] Appl. No.: 804,560

[22] Filed: Jun. 8, 1977

[30] Foreign Application Priority Data

Jun. 14, 1976 [DE] Fed. Rep. of Germany ....... 2626571

[51] Int. Cl.$^2$ ............................ C25B 9/00; C02B 1/82
[52] U.S. Cl. .................................. 204/276; 204/152; 204/228; 204/271
[58] Field of Search ............... 204/271, 276, 228, 149, 204/152, 273, 223, 238; 210/243

[56] References Cited

U.S. PATENT DOCUMENTS

| | | | |
|---|---|---|---|
| 3,888,751 | 6/1975 | Minegishi | 204/276 X |
| 3,925,184 | 12/1975 | Cave | 204/273 X |
| 3,926,771 | 12/1975 | Lieb et al. | 204/273 X |

*Primary Examiner*—John H. Mack
*Assistant Examiner*—D. R. Valentine
*Attorney, Agent, or Firm*—Hans Berman

[57] ABSTRACT

A purification unit includes an electrolytic cell adapted to hold a body of water to be purified and provided with two electrically insulated electrodes, a pump supplying the water to be purified to the cell through a filter and driving purified water out of the unit, a power supply for supplying electrolyzing current to the electrodes, a control circuit which generates a sensible signal indicative of the operating conditions of the pump, the power supply, and the filter, and a housing which encloses the cell, the pump, the power supply, and the control circuit. The housing is partly received in a container for the raw water. The portion of the housing projecting from the container carries a discharge spout for purified water, a connector for an external source of current, and the signal display elements of the control circuit.

9 Claims, 4 Drawing Figures

WATER SUPPLY SYSTEM

This invention relates to the supply of water fit to drink, and particularly to a water system capable of purifying raw water by anodic oxidation.

It is known to pass electric current between two electrodes immersed in water to be purified and to destroy organic matter in the water, including pathogenic microorganisms, by means of compounds formed at the anode surface. The known devices of the type described which supply sanitary drinking water are often relatively complex, difficult to operate by laymen, and not readily adapted by them to different conditions.

A primary object of the invention is the provision of a drinking water supply system which is practically foolproof in its operation, easy to maintain in good operating condition, and adaptable to different sources of raw water.

With these and other objects in view, the invention provides a system for supplying water fit to drink which includes an electrolytic cell adapted to hold a body of the water to be purified. Two electrodes are spacedly mounted in the cell and electrically insulated from each other. The cell, in the operating condition of the system, is fixedly fastened to a pump, to a power supply, and to a control device. The pump supplies the water to be purified to the cell and discharges purified water from the cell in a predetermined path. The powder supply supplies electrolyzing current to the electrodes in the cell. The control device generates a sensible signal, such as an optical signal, which indicates the operating condition of the pump and of the power supply.

Additionally, a filter removing particulate impurities from the water discharged by the cell may include a filter element arranged in the water path upstream from the cell, and the control device also preferably generates a sensible signal in response to at least partial clogging of the filter element. When the pump is motor driven, the control device preferably deenergizes the motor when the operating conditions mentioned above deviate from predetermined conditions.

The cell, pump, power supply, and control device may be fastened to each other by a housing in which they are mounted, and access to the enclosed parts of the system is facilitated by two-part construction of the housing, one part enclosing the power supply, the control device, and the electrolytic cell, the other part the pump and the filter. A one-way valve between the intake of the housing and the cell prevents unintentional loss of purified water. Use of the system is facilitated by a tubular discharge spout pivotally mounted on the housing.

The water to be purified may be held in a container in which the purification unit is releasably, but fixedly mounted and with which the pump communicates through an intake on the housing. The housing preferably has a wall portion remote from the intake and outside the container. The aforementioned spout communicating with the cell for discharge of purified water and a signal display of the control device may be mounted on this wall portion which also may carry a connector for connecting the purification unit to an external source of electric current.

Other features, additional objects, and many of the advantages of this invention will readily be appreciated as the same becomes better understood by reference to the following detailed description of a preferred embodiment when considered in connection with the appended drawing in which.

Figure 1:
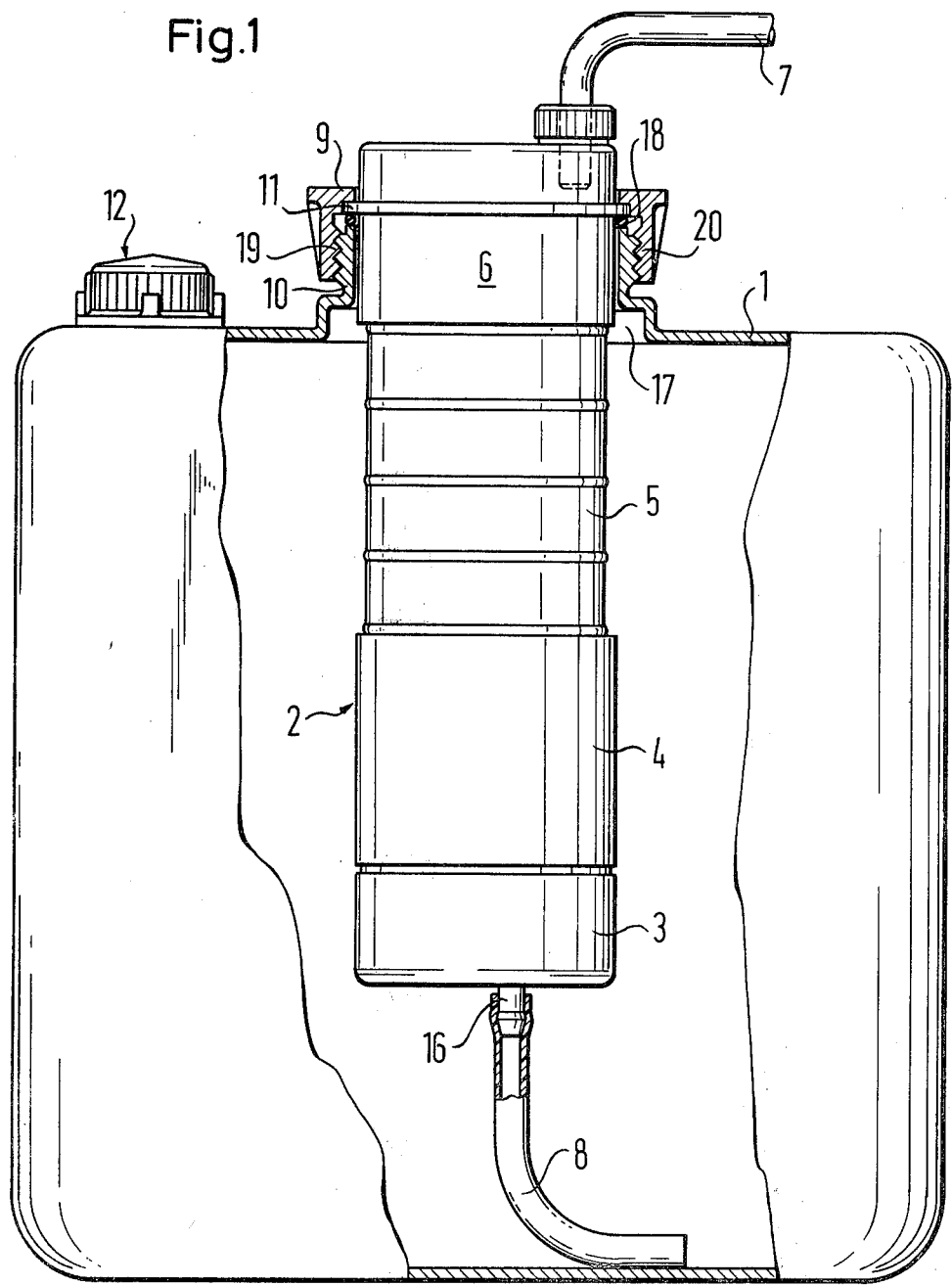
FIG. 1 shows a water supply system of the invention including a storage can with built-in purification unit in side elevation, the can being partly broken away to show its contents.

Referring initially to FIG. 1, there is seen a 5-gallon water storage can 1 of generally rectangular configuration whose top wall is provided with a normally capped filling nipple 12 and a much larger central nipple 10 extending upward from a circular aperture 17 in the can 1. The housing 2 of a purification unit is of generally circular cross section about a vertical axis and passes through the aperture 17. The topmost section 6 of the housing encloses a power supply and controls, as will presently be described with reference to FIGS. 3 and 4.

A radial flange 11 on the housing section 6 is clamped fast between a sealing ring 18 on the annular end face of the nipple 10 and a screw collar 9 whose internal threads 19 matingly engage external threads 20 on the nipple 10. A cell section 5 of the housing 2 coaxially depends from the section 6 and houses an electrolytic cell. The next lower housing section 4 receives a water filter, and an electrically driven pump is arranged in the lowermost section 3 of the housing 2 from which the intake pipe 16 of the pump projects into a flexible hose 8 long enough to reach the bottom of the can 1.

Figure 2:
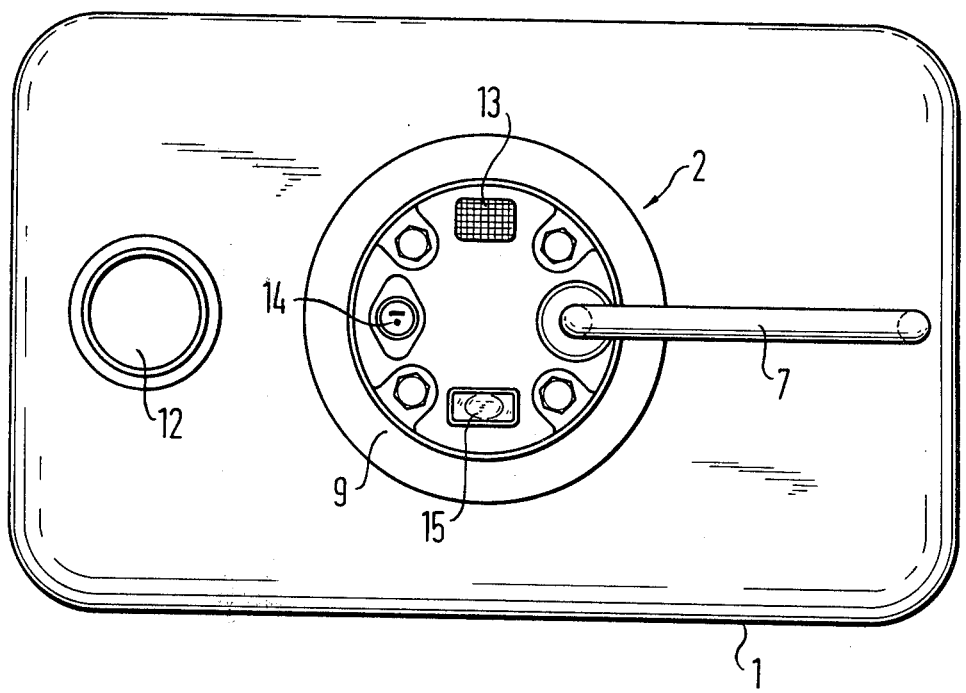
FIG. 2 is a top plan view of the apparatus of FIG. 1.

As is better seen in FIG. 2, the top wall of the housing 2 carries a light assembly 13, a plug 14 for connection to a source of electric current, and a push button starting switch 15. A discharge spout 7 is mounted in the top wall for pivoting movement about an upright axis.

The operating elements concealed in the housing 2 are closely similar to those of the modified purification unit illustrated in FIG. 3, and differ only in dimensions and spatial arrangement from those now to be described with reference to FIG. 3.

The housing 21 of the modified unit essentially consists of three plastic parts, generally of circular cross section about an upright axis. A cover plate 49 of the housing carries the light assembly 13, switch 15, and connector plug (not visible in FIG. 3). It is set into the top section 22 of a second plastic housing part having two additional sections 25, 33. The section 22 is secured in a nipple 10' of a water storage can 1', otherwise identical with the can 1, by a snap fit, a rib 11' of the housing section 22 being received in a groove of the nipple 10'. External threads 24 on the axially short section 25 of the second housing part connect the section to the third, generally cup-shaped housing part 23.

An integral partition 28 radially connects the section 25 to the reduced lowermost section 33 of the second housing part. The partition axially separates a control and power supply compartment 26, radially bounded by the housing section 22 from a cell 27 in the section 33. An integral pipe 48 extends upward from the partition 28 through the cover plate 49 and pivotally receives one end of the discharge spout 7. The section 33 and the housing part 23 define therebetween an annular chamber 34 which is upwardly sealed by the partition 28 and downwardly bounded by a radial plate 38. Radially elongated recesses in the top face of the plate 38 are axially aligned with the lower edge of the housing section 33 to provide connections between the cell 27 and the annular chamber 34. The bottom wall 43 of the housing part 23 and the plate 38 axially bound a pump chamber 44 which communicates with the chamber 34 through notches 47 in the circumference of the plate 38. A nipple 41 on the outer face of the bottom wall 43 is provided with a ball valve 42 spring biased toward the closed position and permitting fluid flow from the can 1' into the pump chamber 44 only. A tubular socket 39 integrally depending from the bottom wall 43 provides four feet for the purification unit, the feet being separated by openings 40. The hose 8, not shown in FIG. 3, normally depends from the nipple 41.

A rotary pump 46 is mounted in the chamber 44 to draw water into the chamber through the one-way valve 42. The pump is driven by an electric motor 29 in the control compartment 26, the output shaft 45 of the motor extending over almost the entire axial length of the housing part 23, but being only partly indicated. The pumped water is driven through the notches 47 into the annular chamber 34 and through a tubular filter 35 secured in circular grooves 36, 37 of the partition 28 and the plate 38. The filtrate enters the bottom of the cell 27 through the recesses in the plate 38 and rises between electrodes 30, 31, 32 in the cell, the electrodes 30, 31 being connected to a source of electrolyzing current by solid conductors, while the closely spaced bipolar electrodes 32 are mounted on insulators in a manner known and not specifically illustrated. Anodically purified water is discharged by the pump 46 from the cell 27 through the spout 7.

Figure 4:
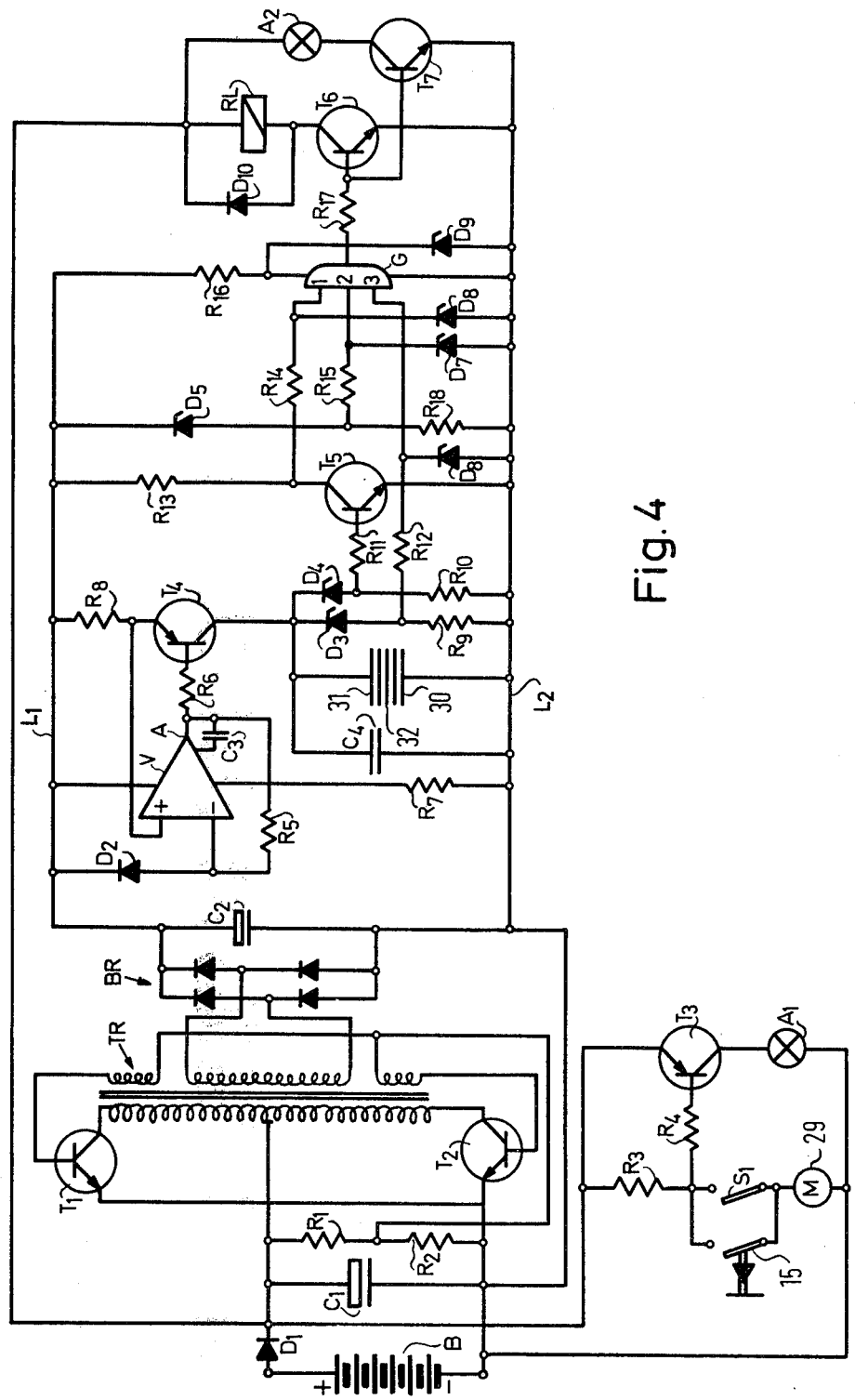
FIG. 4 diagrammatically illustrates electrical circuitry common to the devices of FIGS. 1 and 3.

FIG. 4 shows preferred circuitry for the power supply and controls of the water supply systems of the invention. It uses a 12-volt storage battery B as an external current source. The battery is connected through the connector 14 (not shown in FIG. 4) and a diode $D_1$ to a push-pull and direct potential transformer circuit which includes a push-pull oscillator operating in a known manner and including two transistors $T_1$, $T_2$ in common emitter circuit, a transformer TR, and two resistors $R_1$, $R_2$. Such push-pull oscillators and their mode of operation are known, for example, from "Taschenbuch der Hoch frequenz technik" (Manual of High-Frequency Technique) by Meincke/Grundlach, 3rd ed., page 1166). The oscillation frequency of the push-pull oscillator is determined by the self-capacitance of the circuit, particularly of the transistors and of a capacitor $C_1$ which is arranged between the poles of the battery B and equalizes voltage peaks toward the battery. The input voltage is stepped up by the transformer TR. The secondary transformer winding is connected to a bridge full-wave rectifier BR. A capacitor $C_2$ connected across the output terminals of the rectifier smoothes the DC voltage. A direct potential higher than the battery potential is derived from the capacitor $C_2$ for operation of the electrolytic cell and for the control circuits presently to be described. The potential is applied to the electrodes 30, 31 of the cell, and the bipolar electrodes 32 assume voltages according to their positions, the spacing between adjacent, oppositely charged electrode surfaces being not more than 4 mm, a spacing of only 1 mm being usually feasible and desirable.

The motor 29 driving the pump 46 is directly energized by the battery B. A fixed resistor $R_3$ and two parallel switches $S_1$, 15 control current flow to the motor 29. The afore-described startng switch 15 is manually operated by means of a push button. The switch $S_1$ is constituted by contacts of a relay RL which is operated by the control circuit in accordance with current flow through the electrolytic cell and with the potential applied across the cell, as will presently be described. A pilot lamp $A_1$ in the light assembly 13 is arranged in series with the collector and emitter of a switching transistor $T_3$ parallel to the circuit of the motor 29. The base of the transistor $T_3$ is connected to the junction of the switch $S_1$ and the resistor $R_3$ through a resistor $R_4$.

When the switch 15 or the switch $S_1$ are closed, current flows to the motor 29 through the resistor $R_3$. If the purification unit operates properly, the potential across the resistor $R_3$ is not sufficient to switch the transistor $T_3$, whereby the lamp $A_1$ remains dark. If the filter 35 is excessively clogged by impurities, the current through the motor 29 rises sufficiently to switch the transistor $T_3$ and thereby to energize the pilot lamp $A_1$ and to warn the user that the filter 35 needs to be replaced or cleaned.

The potential of a 12-volt battery may not be sufficient to produce adequate current flow between the electrodes 30, 31, and the electrolytic cell is energized by the potential transformer circuit described above. A current control circuit prevents excessive current drain from the battery B when water of unusually high conductivity is supplied to the cell. The current control circuit includes a fixed resistor $R_8$ in series arrangement with the collector and emitter of a transistor $T_4$ and the electrodes 30, 31. To keep the current through the transistor $T_4$ substantially constant, the base of the transistor $T_4$ is connected through a resistor $R_6$ with the output A of a differential amplifier V whose positive input is connected to the emitter of the transistor $T_4$, and whose inverting input is connected to a source of reference potential. The resistor $R_6$ limits the base current of the transistor $T_4$. The source of reference potential is a Zener diode $D_2$ operated in inverse direction. The differential amplifier V compares the reference potential with the potential across the resistor $R_8$ and controls the transistor $T_4$ in such a manner that both potentials agree. A feed-back resistor $R_5$ is arranged between the output A and the inverting input of the differential amplifier V and reduces the amplification of the amplifier V sufficiently to produce a linear response over the entire control range. A capacitor $C_3$, in connection with the feedback resistor $R_5$, provides frequency compensation. The amplifier V is energized through lines $L_1$, $L_2$ from the output of the direct potential transformer circuit. Line $L_1$ will be referred to hereinbelow as the hot line, line $L_2$ as the ground line. A current feedback resistor $R_7$ is arranged between the current supply terminal of the differential amplifier V and the ground line $L_2$ and limits the base current of the transistor $T_4$ if the conductivity of the water between the electrodes 30, 31 is extremely low or if no water is present in the electrolytic cell. A capacitor $C_4$ is arranged in parallel with the electrodes 30, 31 suppresses voltage peaks.

A safety circuit connected to the electrolytic cell stops the pump motor 29 and indicates the motor stoppage if conditions are not proper for safely purifying the water in the electrolytic cell. The motor is switched off by the contacts $S_1$ of the relay RL, and the deenergizing of the motor is indicated by a second pilot lamp $A_2$ in the light assembly 13. A diode $D_3$, arranged in the inverse direction, and a current limiting resistor $R_9$ are connected in one series circuit between the electrodes 30, 31, and a corresponding diode $D_4$ and a current limiting resistor $R_{10}$ in s second series circuit. As the conductivity of the water in the cell 27 increases, while the current through the cell is held constant by the fore-described current control circuit, the potential across the electrodes 30, 31 decreases and ultimately causes the diode $D_3$ to block a conductive path from the electrode 31 to input 3 of an AND gate G which is connected to the junction of the diode $D_3$ and the resistor 9 through a resistor $R_{12}$.

The output of the gate G is connected to the base of a transistor $T_6$ through a resistor $R_{17}$. The emitter and collector of the transistor $T_6$ and the winding or the relay RL are arranged in series across the poles of the battery B. The pilot lamp $A_2$ is similarly arranged in series with a transistor $T_7$ across the battery poles. The base of the transistor $T_7$ is connected to the base of the transistor $T_6$. The relay RL and the pilot lamp $A_2$ are thus independent from any malfunction of the high-voltage supply, and the latter is not required to furnish operating current for the relay and the lamp $A_2$. The resistor $R_{17}$ which is interposed between the output terminal of the gate G and the bases of the transistors $T_6$, $T_7$ limits the base current. A diode $D_9$ and a resistor $R_{16}$ stabilize the voltage supplied to the gate G.

The pilot lamp $A_2$ lights up when conditions in the cell 27 are proper for operation. The transistors $T_6$ and $T_7$ block the relay RL and the lamp $A_2$ if any one of the three input terminals of the gate does not receive a proper signal. In the absence of proper signals, the motor 29 and the lamp $A_2$ are deenergized.

If the conductivity of the water in the cell 27 is too low, the voltage across the electrodes 30, 31 rises above the limit for which the purification unit is designed, and thus causes the diode $D_4$ to become conductive. Current is permitted to flow through the resistor $R_{10}$ to ground line $L_2$. The base of a transistor $T_5$ is connected through a resistor $R_{11}$ with the junction of the diode $D_4$ with the resistor $R_{10}$. The transistor $T_5$ is switched. The input 1 of the AND-gate G is connected to the collector of the transistor $T_5$ through a resistor $R_{14}$ and is switched off. A resistor $R_{13}$ limits the collector current of the switched transistor $T_5$. Excessive voltage across the electrodes 30, 31 because of low water conductivity or for any other reason thus causes the pump 46 to stop and the light $A_2$ to be extinguished.

The input terminal 2 of the gate G is connected through a resistor $R_{15}$ to the junction of a diode $D_5$ and a resistor $R_{18}$ which are arranged in series circuit between the line $L_1$, $L_2$. If the voltage available at the capacitor $C_2$ decreases below the inverse voltage of the diode $D_5$, the input signal at input 2 blocks the AND gate G, the pump 46 stops and the pilot light $A_2$ is extinguished. Diodes $D_6$, $D_7$, $D_8$ are interposed respectively between the three input terminals of the gate G and the ground line $L_2$ to limit the potentials applied to the gate G inputs. A diode $D_{10}$ is arranged parallel to the coil of the relay RL to protect the transistor $T_6$ against excessive potentials due to the self-inductance of the coil.

The control and power supply circuit illustrated in FIG. 4 permits the use of an automotive battery for operating the purification unit of the water supply system of the invention. Such a battery is often available where the water supply systems of the invention are of greatest utility. The output potential of such a battery is not always sufficient to operate an electrolytic cell of the invention for rapid and reliable anodic oxidation of impurities, and the power supply described above provides a voltage reserve adequate for purification of raw waters varying greatly in conductivity. The power supply automatically controls cell voltage for the purification of aqueous liquids mainly consisting of rain water or containing some brackish water. Adequate operation with a range of water conductivity between 100 $\mu$S and 2000 $\mu$S (one siemens = one mho) is ensured without intervention of the operator. Except under conditions of extreme microbial contamination and regardless of its conductivity, the water drawn from the can 1, 1' is free from viable, pathogenic microorganisms when discharged from the spout 7.

When equipped with the can 1, 1', the water supply system of the invention is self-contained to the extent of being independent of a local water source. However, the purification unit may be employed without the normally associated container. Thus, the intake pipe 16 or the nipple 41 may be connected to a water line or a remote water tank through a hose such as the hose 8, and purification units of the invention so equipped are well adapted to service in temporary dwellings, such as weekend houses, boats, or camping trailers equipped with a permanently installed water distribution system.

Figure 3:
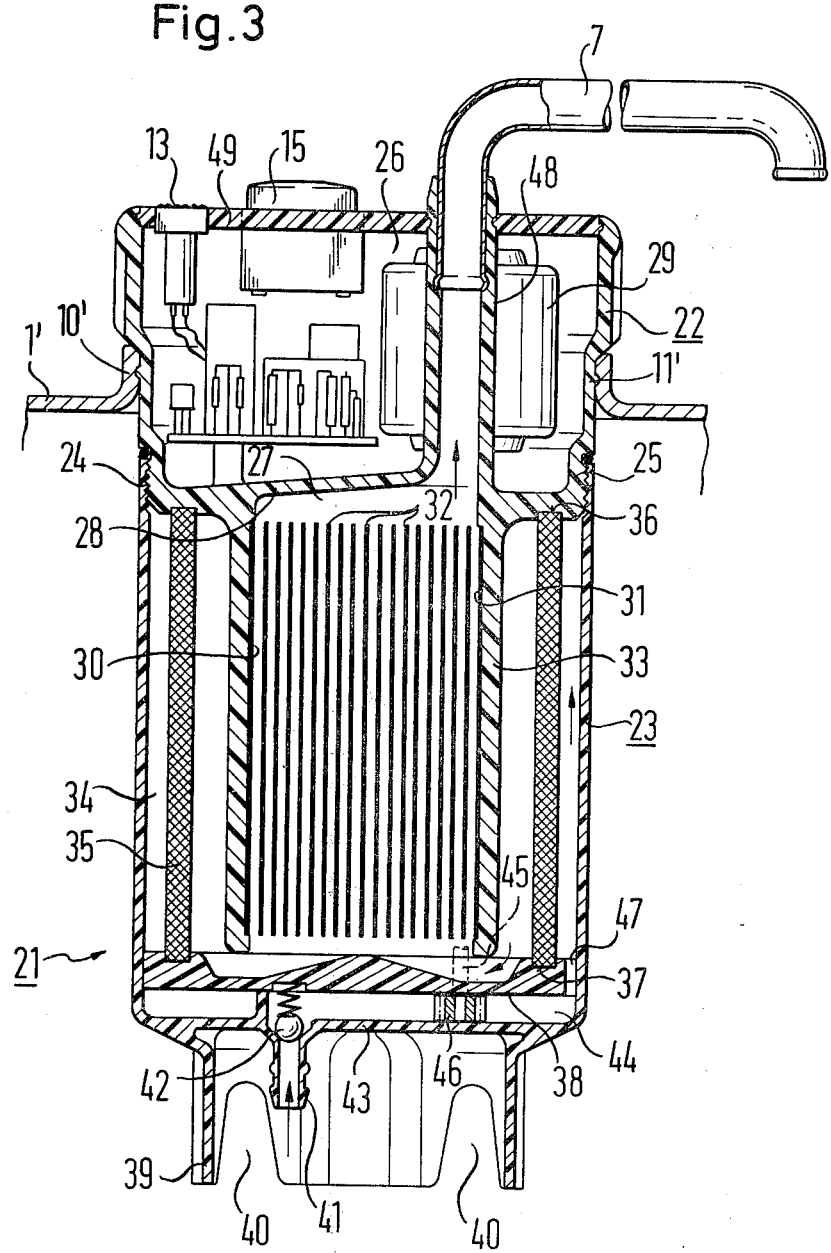
FIG. 3 illustrates apparatus of the invention closely similar to that of FIG. 1.

The purification units of the invention may be immersed partly in a natural body of water, and the unit illustrated in FIG. 3 is specifically equipped with the notched socket 39 as a stand for this purpose. When the purification unit is removed from the can 1', the can may be properly cleaned and disinfected, and then placed under the spout 7 to receive purified water for limited storage and for transportation elsewhere.

While a purification unit of the invention readily disinfects drinking water, ambient conditions may make it difficult to maintain a low microorganism count in the water after purification. If drinking water is to be stored, it is preferred to run the purification unit continuously on a body of previously treated water in the can 1, 1' and to return the water discharged from the spout 7 to the can through a hose connecting the spout with the nipple 12. Such repeated passage through the purification unit may also permit the production of safe drinking water from a raw water too badly contaminated to be disinfected by a single passage through the cell 27.

A storage battery is usually the only available source of electric current where the water supply system of the invention is most beneficial, but operation from alternating line voltage of 110 volts is possible by means of a conventional adapter without structural changes in the illustrated apparatus. Conversely, the power supply system shown in FIG. 4 is readily modified for operation on 110 volt AC, and may be provided with an adapter, internal or external, for operation on battery current.

Normal maintenance of the water supply system requires only the periodic cleaning or replacement of the filter element 35 after release of the housing part 23 from the threads 24 of the section 25 and withdrawal of the pump 46 with the plate 38 from the motor shaft 45 whose square end is slidably received in a mating opening of the pump impeller. While not explicitly illustrated, the filter element in the purification unit of FIG. 1 is axially juxtaposed to the electrolytic cell in the housing section 5, and its associated housing section 4 may similarly be released from the section 5 for access to the filter.

It should be understood, of course, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. A system for supplying water fit to drink comprising:
   (a) a container adapted to hold a body of water to be purified;
   (b) a housing having an intake for water to be purified;
   (c) fastening means releasably fastening a portion of said housing including said intake in said container for communication with said body;
   (d) outlet means on said housing and extending outward of said container for discharge of purified water,
      (1) said inlet and said outlet means defining a path for the flow of water through said housing from said inlet to said outlet means;
   (e) means in said housing defining a cell;
   (f) two electrodes spacedly mounted in said cell and electrically insulated from each other;
   (g) pump means mounted in said housing for conveying the water to be purified in said path from said intake through said cell to said outlet means;
   (h) filter means mounted in said housing and interposed in said path between said intake and said cell for removing particulate matter from said water prior to entry into said cell;
   (i) power supply means in said housing for supplying electrolyzing current to said electrodes; and
   (j) signal generating means for generating a sensible signal indicative of the operating condition of said pump means and of said power supply means.

2. A system as set forth in claim 1, wherein said signal generating means include means generating a sensible signal in response to at least partial clogging of said filter element.

3. A system as set forth in claim 2, wherein said pump means include a pump and a motor drivingly connected to said pump, the system further including means for deenergizing said motor when said operating conditions deviate from predetermined conditions.

4. A system as set forth in claim 1, wherein said housing has two parts releasably secured to each other, one part of said housing enclosing said power supply means, said signal generating means, and said cell, the other part of said housing enclosing said pump means and said filter means.

5. A system as set forth in claim 1, further comprising a one-way valve in said path between said intake and said cell.

6. A system as set forth in claim 1, wherein said outlet means includes a tubular spout pivotally mounted on said housing.

7. A system as set forth in claim 1, wherein said fastening means include threaded means securing said portion of the housing to said container.

8. A system as set forth in claim 1, wherein said housing has, a wall portion remote from said intake and outside said container, said signal generating means including signal display means mounted on said wall portion for displaying said sensible signal.

9. A system as set forth in claim 8, wherein said wall portion carries connector means for connecting said power supply means to a source of electric current outside said housing.

* * * * *

UNITED STATES PATENT AND TRADEMARK OFFICE
CERTIFICATE OF CORRECTION

PATENT NO. : 4,119,520

DATED : October 10, 1978

INVENTOR(S) : Peter Paschakarnis, Bernd Hengst, and Rainer Wychnanek

It is certified that error appears in the above-identified patent and that said Letters Patent are hereby corrected as shown below:

Claim 1, lines 13 and 15, change "inlet" to -- intake --

Signed and Sealed this

Sixth Day of February 1979

[SEAL]

Attest:

RUTH C. MASON
Attesting Officer

DONALD W. BANNER
Commissioner of Patents and Trademarks